United States Patent
Moore et al.

[11] Patent Number: 5,421,609
[45] Date of Patent: Jun. 6, 1995

[54] RUPTURE DEVICE

[75] Inventors: Walter A. Moore, Ogden, Utah;
Leland B. Kort, Lakewood, Colo.;
Kelly B. Johnson, Layton, Utah

[73] Assignee: Morton International, Inc., Chicago, Ill.

[21] Appl. No.: 230,588

[22] Filed: Apr. 21, 1994

[51] Int. Cl.⁶ .............................................. B60R 21/26
[52] U.S. Cl. .................................................. 280/737
[58] Field of Search .......................... 280/737, 734, 736

[56] References Cited

U.S. PATENT DOCUMENTS

| | | | |
|---|---|---|---|
| 3,834,729 | 9/1974 | Oka et al. | 280/150 |
| 3,856,180 | 12/1974 | Merrell | 222/5 |
| 3,966,226 | 6/1976 | Roth | 280/737 |
| 4,289,327 | 9/1981 | Okada | 280/737 |
| 5,076,607 | 12/1991 | Woods et al. | 280/737 |
| 5,226,561 | 7/1993 | Hamilton et al. | 222/5 |

Primary Examiner—Kenneth R. Rice
Attorney, Agent, or Firm—Lawrence I. Field; Gerald K. White

[57] ABSTRACT

In an air bag inflation system, the present invention reduces the pressure at which gas flow is initiated from a stored gas inflator into an air bag to be inflated. In many air bag inflation systems gas flow normally begins following rupture of a diaphragm due to a pressure differential. In the present system this differential is reduced.

8 Claims, 1 Drawing Sheet

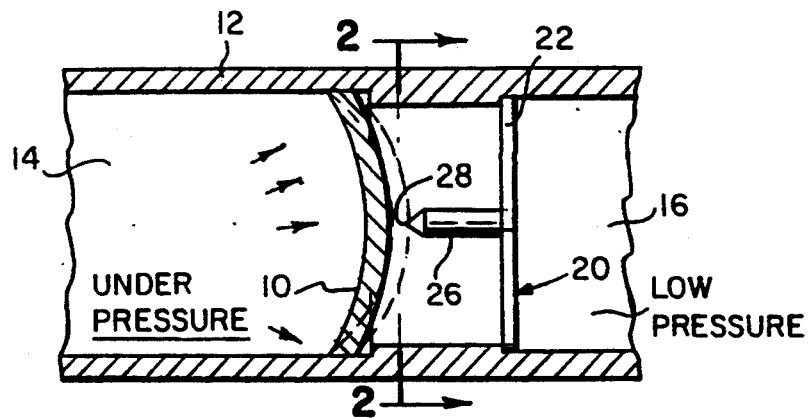
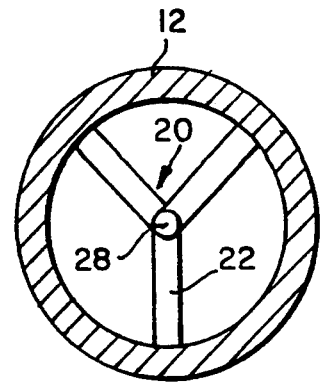
FIG. 1     FIG. 2
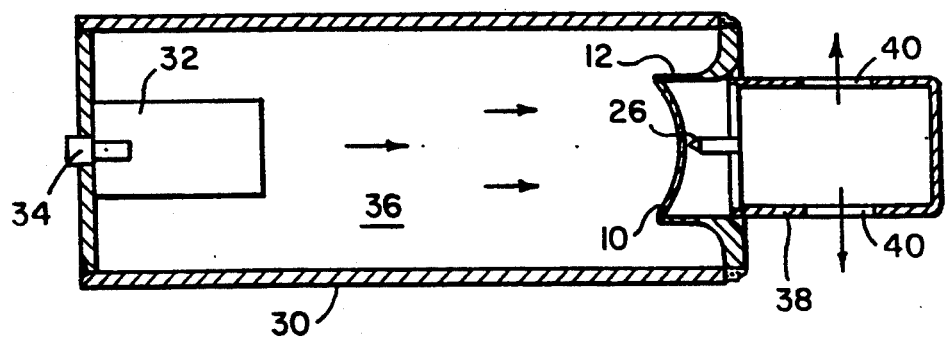
FIG. 3

RUPTURE DEVICE

FIELD OF THE INVENTION

This invention relates to the inflation of airbags with gases for the protection of passengers in motor vehicles such as automobiles by the discharge of gases stored in cylinders or other containers closed by a frangible diaphragm or disk and more particularly to the discharge of such gases at pressures lower than those heretofore required.

DESCRIPTION OF THE PRIOR ART

As evidenced by the patents noted below and by many other recently issued patents, inflatable bag restraint systems for protecting passengers in automobiles are known. Among the known inflation systems are those which include a hybrid gas source in which inflation is accomplished by gases originating both from (1) a confined pressurized source of gas, e.g. in a cylinder or other container and (2) a pyrotechnic gas generating material. In general the confined gas has been released by rupture of a disk either by mechanical means or by pressure of gases produced by ignition of a gas generating means. Each of these methods is subject to certain disadvantages. When a mechanical means is used to puncture the disk, a movable piston or punch is activated to impinge on the disk and rupture it. A separate energy source is required to move the punch or piston and this increases the cost and adds to the complexity of the system. Sticking of the piston or misalignment of the same can produce misfires or other failures.

To insure that the disk ruptures, the gases are often at very high temperatures and pressures, sufficient to damage the air bag if they impinge upon it or to injure an occupant of a vehicle when the inflator is activated.

Furthermore rupture of the disk at high pressures is disadvantageous because it may result in a high pressure rate rise when filling the air bag. High rise rates are undesirable due to the high reaction loads that are imparted to the air bag module and vehicle instrument panel. Lower pressure rise rates produce a "softer" bag fill which also reduces the potential for injury to out-of-position occupants from impact of high velocity bag deployment.

The present invention provides a means with no moving parts other than the rupture disk itself which operates at a pressure/temperature combination lower than that required in previously known air bag inflating devices.

REPRESENTATIVE PRIOR ART

The following patents are typical of prior art disclosures in which an air bag is inflated by gas after a disk is ruptures either mechanically or by pressure of hot gases,

| Oka et al | 3,834,729 | issued | September 10, 1974 |
| Merrell | 3,856,180 | issued | December 24, 1974 |
| Roth | 3,966,226 | issued | June 29, 1976 |
| Okada | 4,289,327 | issued | September 15, 1981 |
| Woods et al | 5,076,607 | issued | December 31, 1991 | and Hamilton et al. 5,226,561 issued July 13, 1993 and the reference cited thereon.

SUMMARY OF THE INVENTION

The present invention will be readily understood and will become apparent from the description which follows taken in conjunction with the drawings in which:

FIG. 1 is a longitudinal view of a fragment of an air bag inflation system incorporating the structure of this invention;

FIG. 2 is a section through plane 2—2 of FIG. 1;

FIG. 3 is a schematic view of an air bag inflation system in which the device of FIG. 1 may be installed.

As seen in FIG. 1, rupture disk 10 comprises a relatively thin disk made of metal, ceramic or other material suitable for exposure to high temperature and high pressure in stored gas inflation devices of the type described in the above noted patents. Disk 10 is mounted by conventional means in a tube 12. One face of the disk (the left end of FIG. 1) communicates directly with a supply of gas 14 under pressure and the opposite face of the disk is in communication with the atmosphere—or other low pressure gas 16.

Mounted in the unpressurized side of tube 12 is a rupture facilitating device 20 which consists of a spider 22 having several arms 24 symmetrically arranged so as to support a post 26. Post 26 is attached to arms 24, e.g. by welding or other suitable technique. Post 26 terminates at its free end 28 with a sharp point or small radius, or faceted with multiple sharp edges to facilitate petaling which is provided for the purpose of initiating a flaw in the pressure diaphragm or disk 10 when the disk bulges under increased pressure. Post 26 and spider 22 are located on the unpressurized side of diaphragm or disk 10. The location of the end of post 26 must be at a sufficient distance to avoid contact with the diaphragm if it bulges due to normal expansion of gases at maximum storage temperature, handling, or vibration or other effects after the device is installed in a vehicle.

In service a gas bottle 30 contains a gas generator 32 shown schematically in FIG. 3. Gas generator 32 is ignited by an igniter 34 at the time of an automobile collision. Pressure then increases in the stored gas chamber from burning pyrotechic gases which heat the confined stored gas 14. This pressure increase causes the disk 10 to bulge and the diaphragm radius to increase and the thickness of the disk to decrease. The disk bulges until it contacts the rapture inducing device 20 the tip of which initiates a flaw in the diaphragm or disk. This causes subsequent failure, allowing full opening of the diaphragm and flow of the mixed pyrotechnic and pressurized gases into a diffuser 38 from which it exits through ports 40 and flows into an air bag (not shown). Opening of the rupture disk occurs at a lower stress level in the diaphragm than if the diaphragm was ruptured from gas pressure differential alone as in many prior art devices.

The arrangement shown in FIGS. 1 and 2 is applicable to rupture disks in environments other than in air bag inflation devices, e.g. to any system wherein a gas stored under pressure may experience an increase in pressure which must be relieved, but it is particularly useful installed in a hybrid air bag inflation system. By use of the present invention it has been found that inflation of air bags takes place at a more uniform pressure, with less fragmentation of the disk than has previously occurred. Inflation also occurs sooner than with prior art inflators in which the disk is ruptured by gas pressure alone.

By adjusting the spacing of tip 28 from the face of disk 10, it is possible to select a pressure at which the disk will fail.

Having now described preferred embodiments of the invention it is not intended that it be limited except as may be required by the appended claims.

We claim:

1. In a hybrid air bag inflation system in which the air bag is inflated by gas from both a stored pressurized gas supply and gas from a pyrotechnic source which produces hot gas and particles upon ignition of the pyrotechnic source and a rupturable disk is positioned in communication with the stored pressurized gas supply, the improvement which facilitates rupture of said disk at a lower than normal pressure and which consists of a post having an end which is physically spaced from that face of said disk which is not exposed to said stored pressurized gas, so that when said disk bulges due to an increase in pressure of said stored gas, at the time of desired inflation, the disk makes physical contact with an end of said post sufficient to cause a flaw to form in said disk whereby the disk is weakened sufficiently by said contact to rupture at a pressure lower than it would have ruptured in the absence of the formation of said flaw.

2. The system of claim 1 including means to adjust the space between the face of the disk and the end of said post.

3. The system of claim 1 in what the end of the post is faceted with multiple sharp edges to facilitate petaling.

4. The system of claim 1 in which the post is supported by a spider.

5. The system of claim 1 including means to increase the pressure on that face of said disk which is initially exposed to stored gas under pressure.

6. The system of claim 5 wherein said means includes an igniter and a pyrotechnic charge.

7. The system of claim 1 in which the end of the post is shaped to point.

8. The system of claim 1 in which the end of the post is shaped to a radius.

* * * * *

UNITED STATES PATENT AND TRADEMARK OFFICE
CERTIFICATE OF CORRECTION

PATENT NO. : 5,421,609
DATED : 6 June 1995
INVENTOR(S) : Walter A. Moore et al.

It is certified that error appears in the above-indentified patent and that said Letters Patent is hereby corrected as shown below:

At column 2, line 47, "rapture inducing device" should be

--rupture inducing device--.

Signed and Sealed this

Sixteenth Day of July, 1996

BRUCE LEHMAN

Attest:

*Attesting Officer*   *Commissioner of Patents and Trademarks*